United States Patent
Oron

(10) Patent No.: US 10,699,563 B1
(45) Date of Patent: Jun. 30, 2020

(54) MULTI-SENSOR MULTI-OBJECT TRACKING

(71) Applicant: GM GLOBAL TECHNOLOGY OPERATIONS LLC, Detroit, MI (US)

(72) Inventor: Shaul Oron, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/510,260

(22) Filed: Jul. 12, 2019

(51) Int. Cl.
| | | |
|---|---|---|
| *G08G 1/00* | (2006.01) | |
| *G08G 1/01* | (2006.01) | |
| *G08G 1/04* | (2006.01) | |
| *H04N 7/18* | (2006.01) | |
| *G01S 13/86* | (2006.01) | |
| *G08G 1/16* | (2006.01) | |

(52) U.S. Cl.
CPC ......... *G08G 1/0125* (2013.01); *G08G 1/0112* (2013.01); *G08G 1/04* (2013.01); *H04N 7/18* (2013.01); *G01S 13/865* (2013.01); *G01S 13/867* (2013.01); *G08G 1/166* (2013.01)

(58) Field of Classification Search
CPC ...... G08G 1/0125; G08G 1/0112; G08G 1/04; G08G 1/166; H04N 7/18; G01S 13/865; G01S 13/867
See application file for complete search history.

(56) References Cited

U.S. PATENT DOCUMENTS

| | | | | |
|---|---|---|---|---|
| 2016/0196659 A1* | 7/2016 | Vrcelj | ...................... | G06K 9/34 382/154 |
| 2018/0130216 A1* | 5/2018 | Schulter | .................... | G06T 7/20 |
| 2018/0357514 A1* | 12/2018 | Zisimopoulos | ...... | G06K 9/6262 |
| 2019/0258878 A1* | 8/2019 | Koivisto | ............. | G05D 1/0246 |
| 2019/0353775 A1* | 11/2019 | Kirsch | .................. | G01S 13/867 |
| 2019/0384304 A1* | 12/2019 | Towal | ...................... | G06N 3/04 |

OTHER PUBLICATIONS

Pais et al. "OmniDRL: Robust Pedestrian Detection using Deep Reinforcement Learning on Omnidirectional Cameras". Mar. 2019. (Year: 2019).*

* cited by examiner

*Primary Examiner* — Zhihan Zhou
(74) *Attorney, Agent, or Firm* — Cantor Colburn LLP

(57) ABSTRACT

In one example implementation according to aspects of the present disclosure, a computer-implemented method includes projecting, by a processing device, tracked targets onto a virtual cylindrical omni-directional camera (VCOC). The method further includes projecting, by the processing device, detected targets onto the VCOC. The method further includes computing, by the processing device, a two-dimensional intersection-over-union (2D-IOU) between the tracked targets and the detected targets. The method further includes performing, by the processing device, an association between the tracked targets and the detected targets based at least in part on the computed IOU. The method further includes controlling, by the processing device, a vehicle based at least in part on the association.

20 Claims, 7 Drawing Sheets

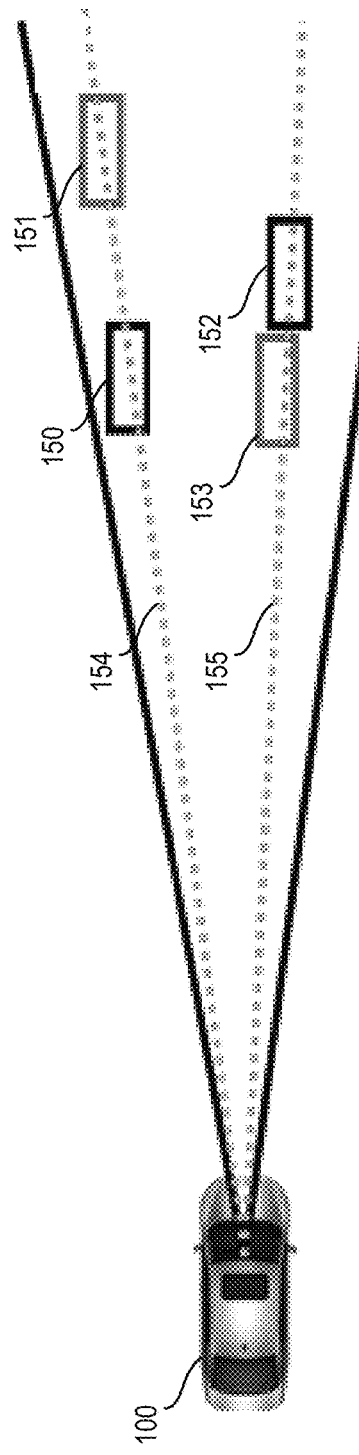
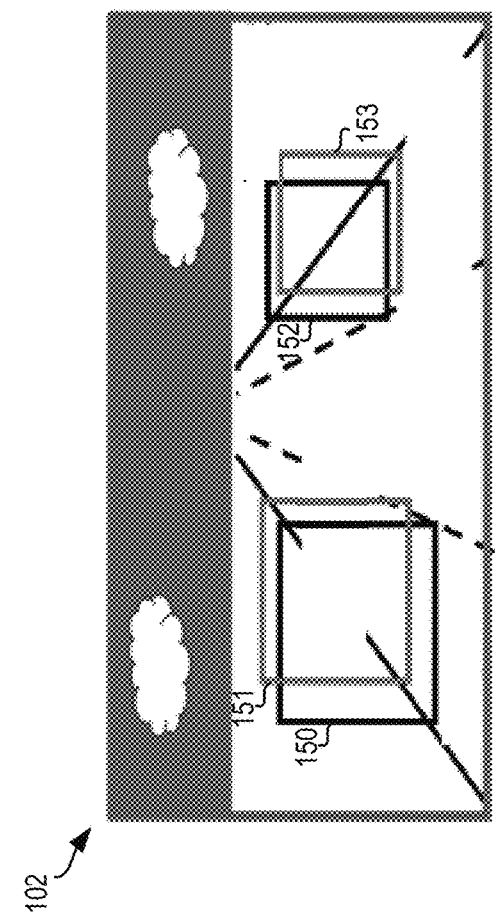
FIG. 1A
FIG. 1B

MULTI-SENSOR MULTI-OBJECT TRACKING

INTRODUCTION

The present disclosure relates to multi-sensor multi-object tracking.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information from the vehicle to any other suitable entity. Various applications (e.g., V2X applications) can use V2X communications to send and/or receive safety messages, maintenance messages, vehicle status messages, and the like.

Modern vehicles can be equipped with different sensors for tracking objects. For example, such vehicles can include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with a radar device(s), LiDAR device(s), and/or the like for performing target tracking. Target tracking includes identifying a target object and tracking the target object over time as the target object moves with respect to the vehicle observing the target object. Images from the one or more cameras of the vehicle can also be used for performing target tracking.

SUMMARY

In one exemplary embodiment, a computer-implemented method for multi-sensor multi-object tracking is provided. The method includes projecting, by a processing device, tracked targets onto a virtual cylindrical omni-directional camera (VCOC). The method further includes projecting, by the processing device, detected targets onto the VCOC. The method further includes computing, by the processing device, a two-dimensional intersection-over-union (2D-IOU) between the tracked targets and the detected targets. The method further includes performing, by the processing device, an association between the tracked targets and the detected targets based at least in part on the computed IOU. The method further includes controlling, by the processing device, a vehicle based at least in part on the association.

In additional examples, computing the 2D-IOU between the tracked targets and the detected targets is performed simultaneously for a plurality of non-overlapping sensors. In additional examples, the tracked targets are three-dimensional. In additional examples, the tracked targets and the detected targets are projected as projected quadrilaterals. In additional examples, computing the 2D-IOU comprises computing an intersection between two projected quadrilaterals. In additional examples, the 2D-IOU between the two projected quadrilaterals is given by the following equation:

$$IOU(q_1, q_2) = \frac{\text{intersection}(q_1, q_2)}{\text{area}(q_1) + \text{area}(q_2) - \text{intersection}(q_1, q_2)}$$

where $\text{area}(q) = (h_2 - h_1) \cdot (\phi_2 - \phi_1)$ ft. In additional examples, the processing device is disposed in the vehicle.

In another exemplary embodiment, a system includes a memory having computer readable instructions and a processing device for executing the computer readable instructions for performing a method for multi-sensor multi-object tracking. The method includes projecting, by the processing device, tracked targets onto a virtual cylindrical omni-directional camera (VCOC). The method further includes projecting, by the processing device, detected targets onto the VCOC. The method further includes computing, by the processing device, a two-dimensional intersection-over-union (2D-IOU) between the tracked targets and the detected targets. The method further includes performing, by the processing device, an association between the tracked targets and the detected targets based at least in part on the computed IOU. The method further includes controlling, by the processing device, a vehicle based at least in part on the association.

In additional examples, computing the 2D-IOU between the tracked targets and the detected targets is performed simultaneously for a plurality of non-overlapping sensors. In additional examples, the tracked targets are three-dimensional. In additional examples, the tracked targets and the detected targets are projected as projected quadrilaterals. In additional examples, computing the 2D-IOU comprises computing an intersection between two projected quadrilaterals. In additional examples, the 2D-IOU between the two projected quadrilaterals is given by the following equation:

$$IOU(q_1, q_2) = \frac{\text{intersection}(q_1, q_2)}{\text{area}(q_1) + \text{area}(q_2) - \text{intersection}(q_1, q_2)}$$

where $\text{area}(q) = (h_2 - h_1) \cdot (\phi_2 - \phi_1) \cdot f_r$. In additional examples, the processing device is disposed in the vehicle.

In yet another exemplary embodiment a computer program product includes a computer readable storage medium having program instructions embodied therewith, wherein the computer readable storage medium is not a transitory signal per se, the program instructions executable by a processing device to cause the processing device to perform a method for multi-sensor multi-object tracking. The method includes projecting, by the processing device, tracked targets onto a virtual cylindrical omni-directional camera (VCOC). The method further includes projecting, by the processing device, detected targets onto the VCOC. The method further includes computing, by the processing device, a two-dimensional intersection-over-union (2D-IOU) between the tracked targets and the detected targets. The method further includes performing, by the processing device, an association between the tracked targets and the detected targets based at least in part on the computed IOU. The method further includes controlling, by the processing device, a vehicle based at least in part on the association.

In additional examples, computing the 2D-IOU between the tracked targets and the detected targets is performed simultaneously for a plurality of non-overlapping sensors. In additional examples, the tracked targets are three-dimensional. In additional examples, the tracked targets and the detected targets are projected as projected quadrilaterals. In additional examples, computing the 2D-IOU comprises computing an intersection between two projected quadrilaterals. In additional examples, the 2D-IOU between the two projected quadrilaterals is given by the following equation:

$$IOU(q_1, q_2) = \frac{\text{intersection}(q_1, q_2)}{\text{area}(q_1) + \text{area}(q_2) - \text{intersection}(q_1, q_2)}$$

where $\text{area}(q) = (h_2 - h_1)(\phi_2 - \phi_1) \cdot f_r$.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 1A depicts a vehicle according to one or more embodiments described herein;

FIG. 1B depicts a projected camera view according to one or more embodiments described herein;

DETAILED DESCRIPTION

Figure 1C:
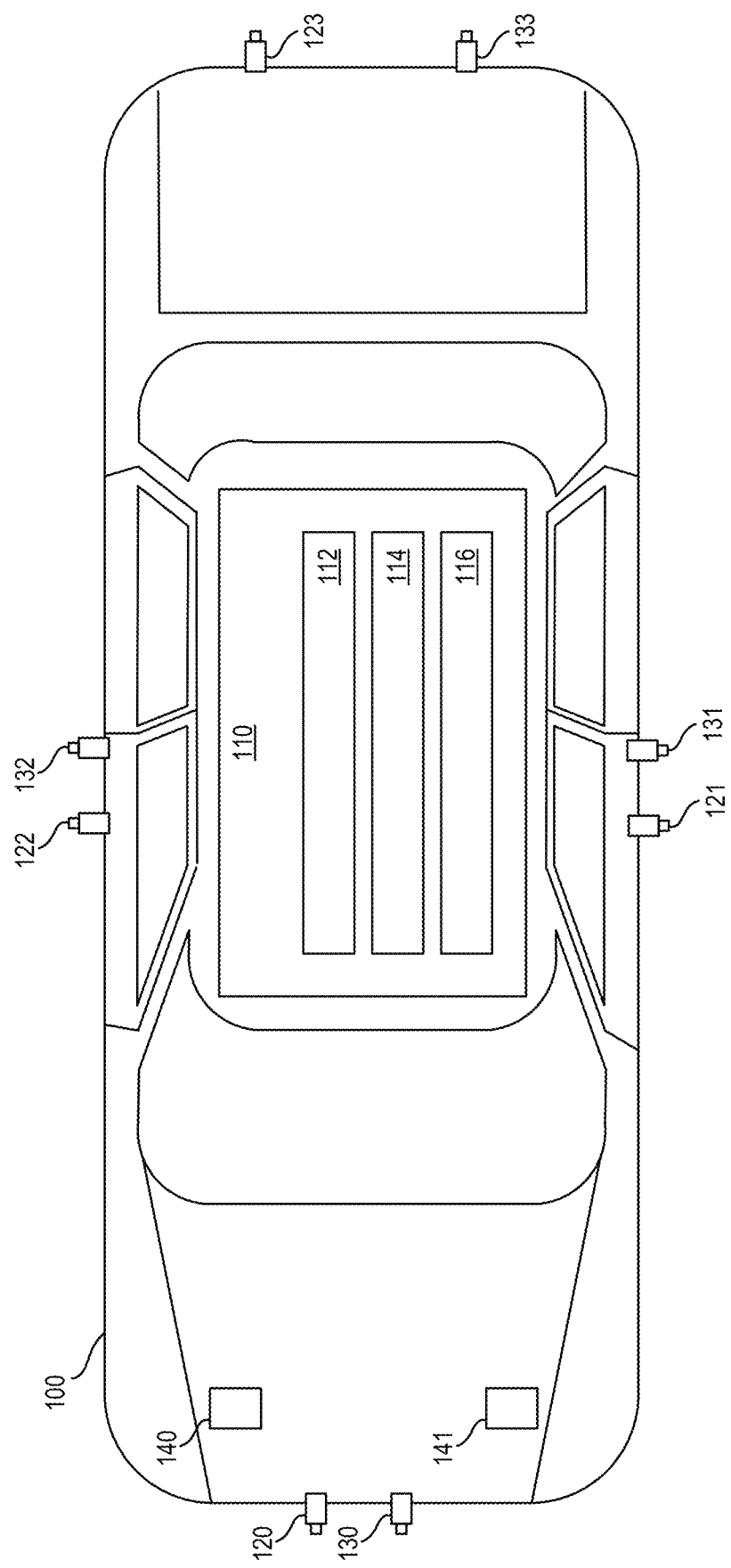
FIG. 1C depicts a vehicle including sensors and a processing system for multi-sensor multi-object tracking according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for multi-sensor multi-object tracking using a two-dimensional intersection-over-union (2D-IOU) onto which targets are projected. This virtual camera is omni-directional and does not suffer from non-overlapping field-of-view or projection numerical instability like standard camera projections.

In particular, the present techniques provide for data fusion of data generated from different sensors (i.e., cameras, radar sensors, LiDAR sensors, etc.) associated with a vehicle. Associations can be formed between tracked objects and observations. According to one or more embodiments described herein, the multi-sensor, multi-object tracking is performed by projecting tracked targets and detected targets onto a virtual cylindrical omni-directional camera, computing a 2D-IOU between the tracked targets and the detected targets, and performing an association between the tracked targets and the detected targets based at least in part on the computed 2D-IOU.

FIG. 1A depicts a vehicle 100 according to one or more embodiments described herein. In this example, two tracked targets (tracked target 150 and target 152) are shown. These targets are detected by sensors (e.g., cameras, radar sensors, LiDAR sensors, etc.) associated with the vehicle 100. Two detections (detection 151 and detection 153) are also shown. The targets/detections are tracked/detected relative to respective lines-of-sight 154, 155 relative to the vehicle 100. FIG. 1B depicts a projected camera view 102 according to one or more embodiments described herein. The projected camera view 102 shows the detection 1, target 1, detection 2, and target 2 of FIG. 1A.

Multi-sensor systems try to obtain large coverage with a minimal number of sensors; this can result in areas with minimal or no overlap between sensors' fields-of-view (FOV). Multi-target tracking in multi-sensor systems utilizes an association between tracked targets (e.g., the tracked targets 150, 152) and detections (e.g., the detections 151, 153 respectively). The association uses a cost/affinity function between target-detection pairs. Intersection-over-union (IOU) in a camera plane is an attractive affinity measure as it mitigates sensor range estimation noise, which can be limiting in cameras. This can be problematic when sensors have minimal or no overlap and/or when detected objects are truncated in the camera view. Projecting an object that is truncated and/or behind the camera's center of projection is numerically unstable. When objects are detected by different modality sensors (not cameras), it is often not clear how to use the 2D-IOU. When multiple targets are detected by different non-overlapping sensors, the processing is done sequentially one sensor at a time which is time and processing resource intensive. The present techniques address these concerns.

FIG. 1C depicts a vehicle 100 including sensors and a processing system 110 for multi-sensor multi-object tracking according to one or more embodiments described herein. In the example of FIG. 1, the vehicle 100 includes the processing system 110, and sensors. The sensors include cameras 120, 121, 122, 123, cameras 130, 131, 132, 133, a radar sensor 140, and a LiDAR sensor 141. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). The cameras 130-133 are long-range cameras that capture images external to the vehicle and farther away from the vehicle 100 than the cameras 120-123. These images can be useful for object detection and avoidance, for example. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The radar sensor 140 measures range to a target object by transmitting electromagnetic waves and measuring the reflected waves with a sensor. This information is useful for determining a target object's distance/location relative to the vehicle 100.

The LiDAR (light detection and ranging) sensor 141 measures distance to a target object by illuminating the target with pulsed laser light and measuring the reflected pulses with a sensor. This information is useful for determining a target object's distance/location relative to the vehicle 100.

Data generated from the cameras 120-123, 130-133, the radar sensor 140, and/or the LiDAR sensor 141 can be used to track a target object relative to the vehicle 100. Examples of target objects include other vehicles, pedestrians, bicycles, animals, and the like. Such data can also be used to generate a view representing a virtual cylindrical omni-directional camera around the vehicle 100. Accordingly, the present techniques provide for projecting multiple different sensors onto a virtual omni-directional cylindrical camera. This provides robust affinity in non-overlapping multi-sensor systems and can also process multiple inputs from non-overlapping sensors in a single cycle and not sensor-by-sensor.

To accomplish this, the processing system 110 includes and utilizes a detection engine 112, an association engine 114, and a control engine 116. Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like. The features and functionality of the components of the processing system 110 are described further herein. The processing system 110 of the vehicle 100 performs multi-sensor multi-object tracking. This process is described further with reference to the following figures.

Figure 2:
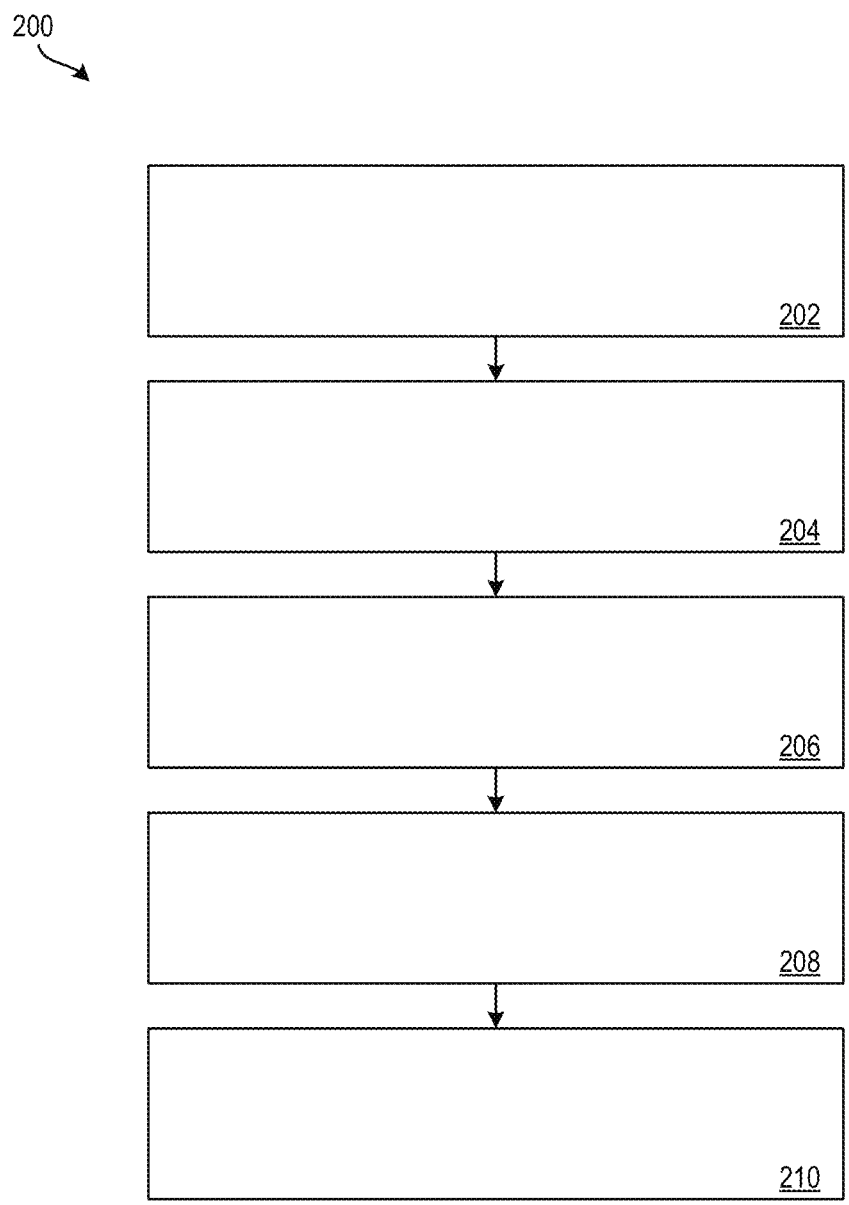
FIG. 2 depicts a flow diagram of a method for multi-sensor multi-object tracking according to one or more embodiments described herein.

FIG. 2 depicts a flow diagram of a method 200 for multi-sensor multi-object tracking according to one or more embodiments described herein. The method 200 can be implemented by any suitable processing device (e.g., the processor 621 of FIG. 6) and/or processing system (e.g., the processing system 110 of FIG. 1 or the processing system 600 of FIG. 6).

At block 202, the detection engine 112 projects tracked targets, which can be three-dimensional, onto a virtual cylindrical omni-directional camera (VCOC). At block 204, the detection engine 112 projects detected targets onto the VCOC. According to one or more embodiments described herein, the VCOC is positioned at the center of the vehicle 100 with an arbitrary focal length (e.g., 0.25m, 0.33m, 0.5m, 0.7m, 1.0m, 1.2m). The tracked targets (e.g., the tracked targets 150, 152) and the detections (e.g., the detections 151, 153) are projected onto the VCOC using projection techniques. Once the targets and detections are projected on the VCOC, a 2D-IOU can be computed using efficient axis-aligned IOU computation techniques as described herein. This computation can be performed simultaneously for multiple non-overlapping sensors (see, for example, FIG. 4), which improves efficiency.

At block 206, the detection engine 112 computes a two-dimensional intersection-over-union (IOU) between the tracked targets and the detected targets.

Blocks 202, 204, and 206, including the functionality of the detection engine 112 are further described with reference to FIG. 3, which depicts a representation 300 of a virtual cylindrical omni-directional camera (VCOC) according to one or more embodiments described herein.

Figure 3:
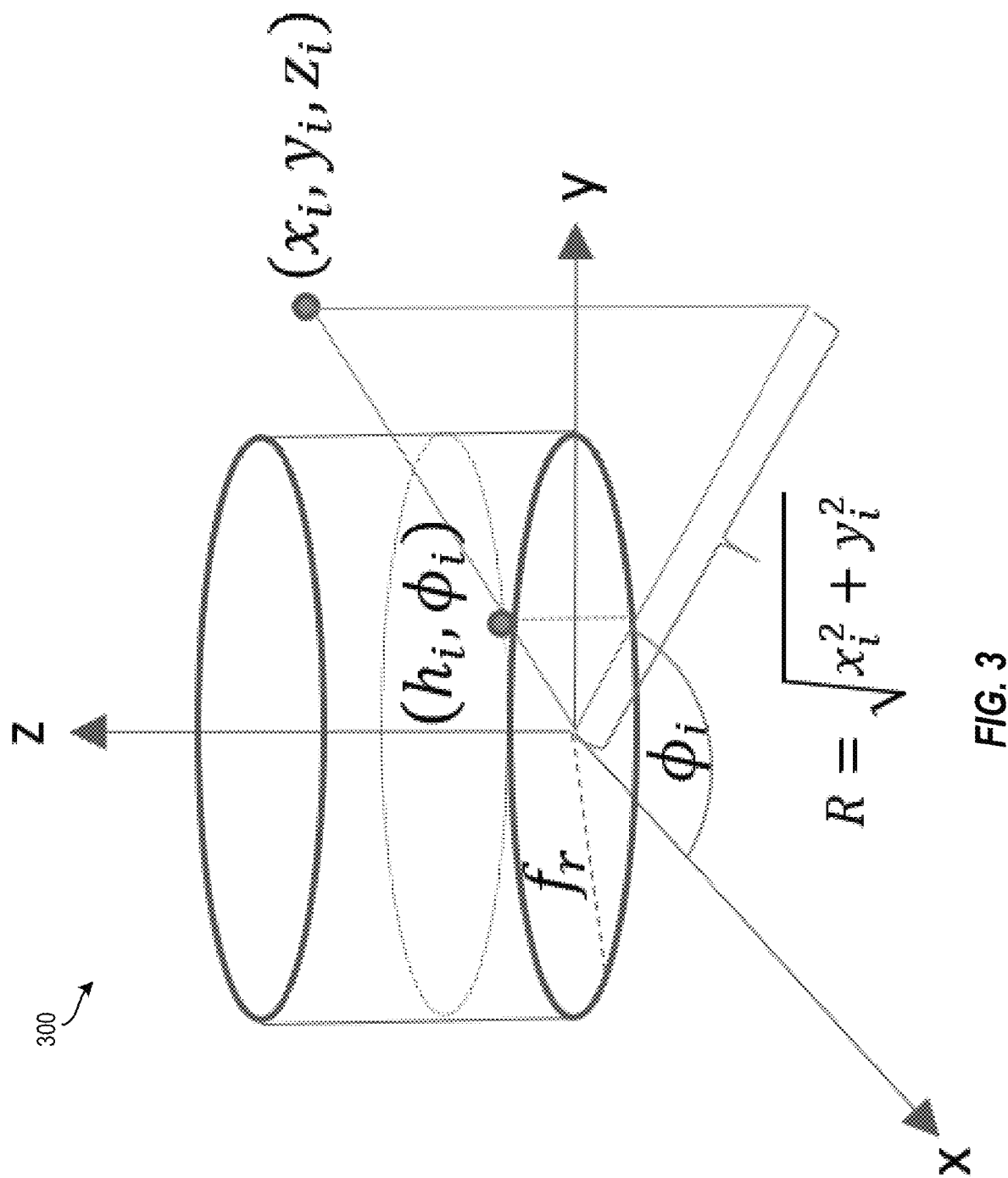
FIG. 3 depicts a representation of a virtual cylindrical omni-directional camera according to one or more embodiments described herein.

Referring to FIG. 3, and without loss of generality, the center of projection of the VCOC is defined at (x, y, z)=(0,0,0) in the host coordinate frame (i.e., the coordinate frame of the vehicle 100, which is acting as the host). The cylinder radius is denoted by $f_r$. A projection of some 3D point $p_i=(x_i, y_i, z_i)$ outside the cylinder hull onto the VCOC is given by $\hat{p}_i=(h_i, \phi_i)$ such that:

$$h_i = \frac{f_r \cdot z_i}{R_i} \quad (1)$$

$$\phi_i = \arctan 2(x_i, y_i) \quad (2)$$

where $$R_i = \sqrt{x_i^2 + y_i^2}.$$

In this way, the tracked targets and detected targets are projected onto the VCOC (blocks 202, 204).

Next, the 2D-IOU between the projections of two 3D cuboids can be computed (block 206). For a given 3D cuboid, the corners of such cuboid are denoted as $c_i=(x_i, y_i, z_i)$ and its cylindrical projection according to equations 0 and 0 as $\hat{c}_i=(h_i, \phi_i)$. After projecting all 8 cuboid corners onto the cylinder we compute the projection bounding quadrilateral given by $q_j=(h_{j1}, \phi_{j1}, h_{j2}, \phi_{j2})$ where $q_j$ is "quadrilateral j" such that:

if $(\max(\phi_i)-\min(\phi_i))>\pi$ then $\forall \phi_i<0, \phi_i=\phi_i+2\pi$
$h_1=\min(h_i), \phi_1=\min(\phi_i)$
$h_2=\max(h_i), \phi_2=\max(\phi_i)$.

The IOU between two projected quadrilaterals is given by:

$$IOU(q_1, q_2) = \frac{\text{intersection}(q_1, q_2)}{\text{area}(q_1) + \text{area}(q_2) - \text{intersection}(q_1, q_2)} \quad (3)$$

where:

$$\text{area}(q)=(h_2-h_1)\cdot(\phi_2-\phi_1)\cdot f_r \quad (4)$$

Figure 5:
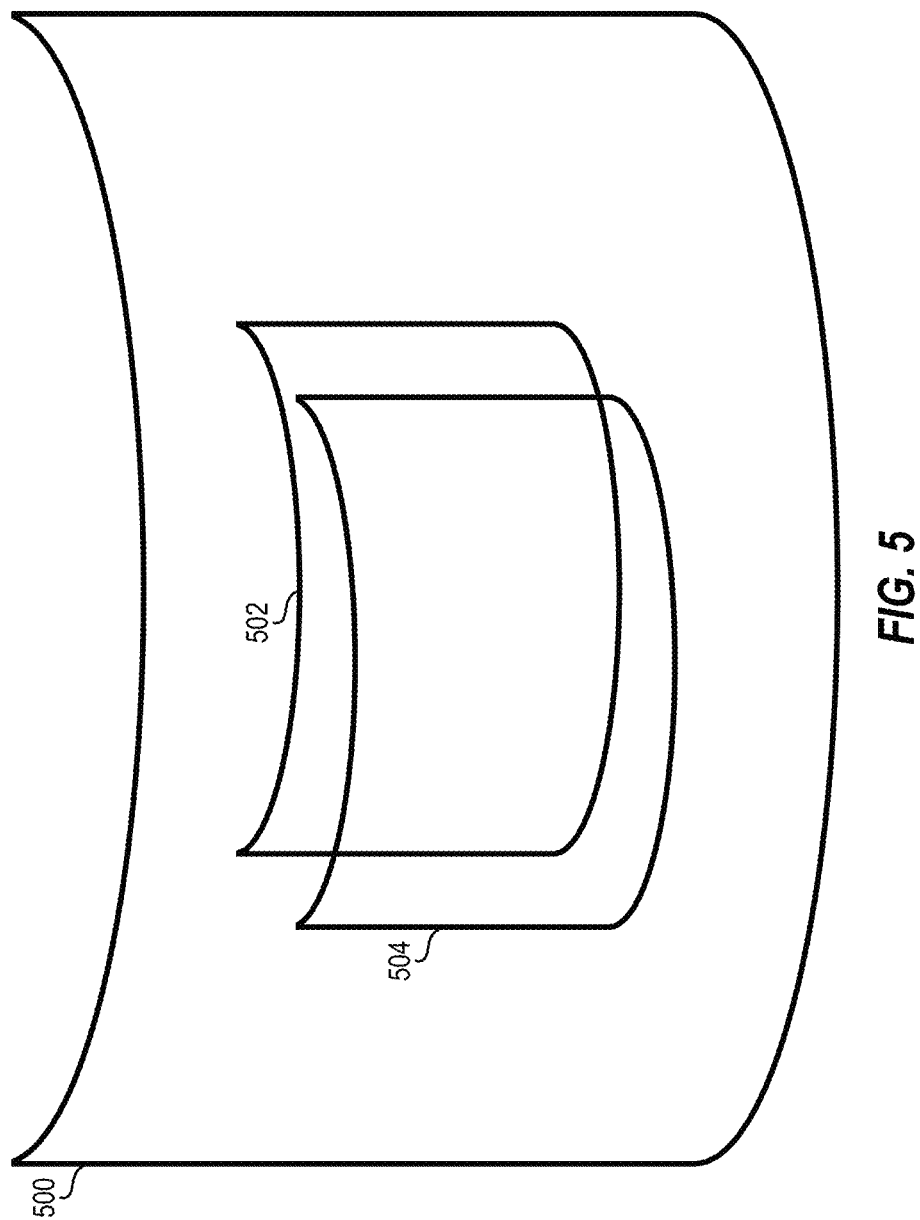
FIG. 5 depicts a diagram of a representation of a virtual cylindrical omni-directional camera according to one or more embodiments described herein.

Two projected quadrilaterals are depicted in FIG. 5, one each for detected targets 502 and tracked targets 504. In particular, FIG. 5 depicts a diagram of a representation 500 of a virtual cylindrical omni-directional camera according to one or more embodiments described herein.

With reference back to FIG. 3, for the intersection $(q_1, q_2)$, the intersecting quadrilateral is determined by considering the following four cases:

| | |
|---|---|
| Case 1 | $\phi_{12}, \phi_{22} \leq \pi$ for both $q_1$ and $q_2$ |
| Case 2 | $\phi_{12} \leq \pi$ for $q_1$ but $\phi_{22} > \pi$ for $q_2$ |
| Case 3 | $\phi_{22} \leq \pi$ for $q_2$ but $\phi_{12} > \pi$ for $q_1$ |
| Case 4 | $\phi_{12}, \phi_{22} > \pi$ for both $q_1$ and $q_2$ |

In Case 1 and Case 4, the intersecting quadrilateral is given by:

$$q_{inter}=(\max(h_{11},h_{21}),\max(\phi_{11},\phi_{21}),\min(h_{12},h_{22}),\min(\phi_{12},\phi_{22})) \quad (5)$$

where $q_i=(h_{i1},\phi_{i1},h_{i2},\phi_{i2})$. Accordingly, $$\text{intersection}(q_1,q_2)=\text{area}(q_{inter}) \quad (6)$$

In Case 2, two intersecting quadrilaterals are computed: the first is computed as in Cases 1 and 4, while the second is computed after shifting $\phi_{11}=\phi_{11}+2\pi$ and $\phi_{12}=\phi_{12}+2\pi$. The intersection area is taken as the maximum intersection between the two computations.

In Case 3, two intersecting quadrilaterals are also computed. In this case, the first is computed as in Cases 1 and 4 (i.e., the original quadrilateral) and the second quadrilateral is computed after shifting $\phi_{21}=\phi_{21}+2\pi$ and $\phi_{22}=\phi_{22}+2\pi$. Again, the intersection area is taken as the maximum intersection between the two computations.

With reference back to FIG. 2, at block 208, the association engine 114 performs an association between the tracked targets and the detected targets based at least in part on the computed IOU. The association can be performed in several ways. For example, a greedy association algorithm or a Hungarian algorithm can be applied to perform association.

Regarding the greedy association algorithm, the goal of this approach is to minimize overall association cost. The greedy association algorithm takes as input a cost matrix between targets and observations M and outputs a set of associations S. The greedy association algorithm is performed as follows: (1) initialize association set as empty where S=[ ]; (2) find a minimal value in the matrix M for some column i and row j; (3) if $M_{ij}$<a threshold, (i) add (i,j) to the association set, (ii) remove column i from M, and (iii) remove row j from M; (4) else end; and (5) if M has no more rows or columns, stop; otherwise repeat.

The Hungarian algorithm takes a cost matrix M and solves an optimization problem s.t. using the following formula:

$$x=\text{argmin}_x \Sigma x_{ij} M_{ij}$$

where $x_{ij}$ are indicator variables s.t. if and only $x_{ij}=1$, then the target i is associated to detection j. The Hungarian algorithm solves this optimization problem providing the optimal assignment given the cost matrix M.

At block 210, the control engine 116 controls the vehicle based at least in part on the association from block 208. The control engine 116 controls the vehicle based at least in part on tracking the target object. Controlling the vehicle 100 can include increasing/decreasing speed, changing a direction, and the like. For example, if the position of the target object relative to the vehicle 100 would cause a collision, the control engine 116 can control the vehicle 100 to avoid the target object. This is possible due to tracking the target object and performing an association between tracked targets and detected targets based on a computed IOU according to the examples of the multi-sensor multi-object tracking described herein. As a result, vehicle technology is improved by controlling the vehicle using such tracking and associations.

Additional processes also may be included, and it should be understood that the process depicted in FIG. 2 represents an illustration and that other processes may be added or existing processes may be removed, modified, or rearranged without departing from the scope and spirit of the present disclosure.

Figure 4:
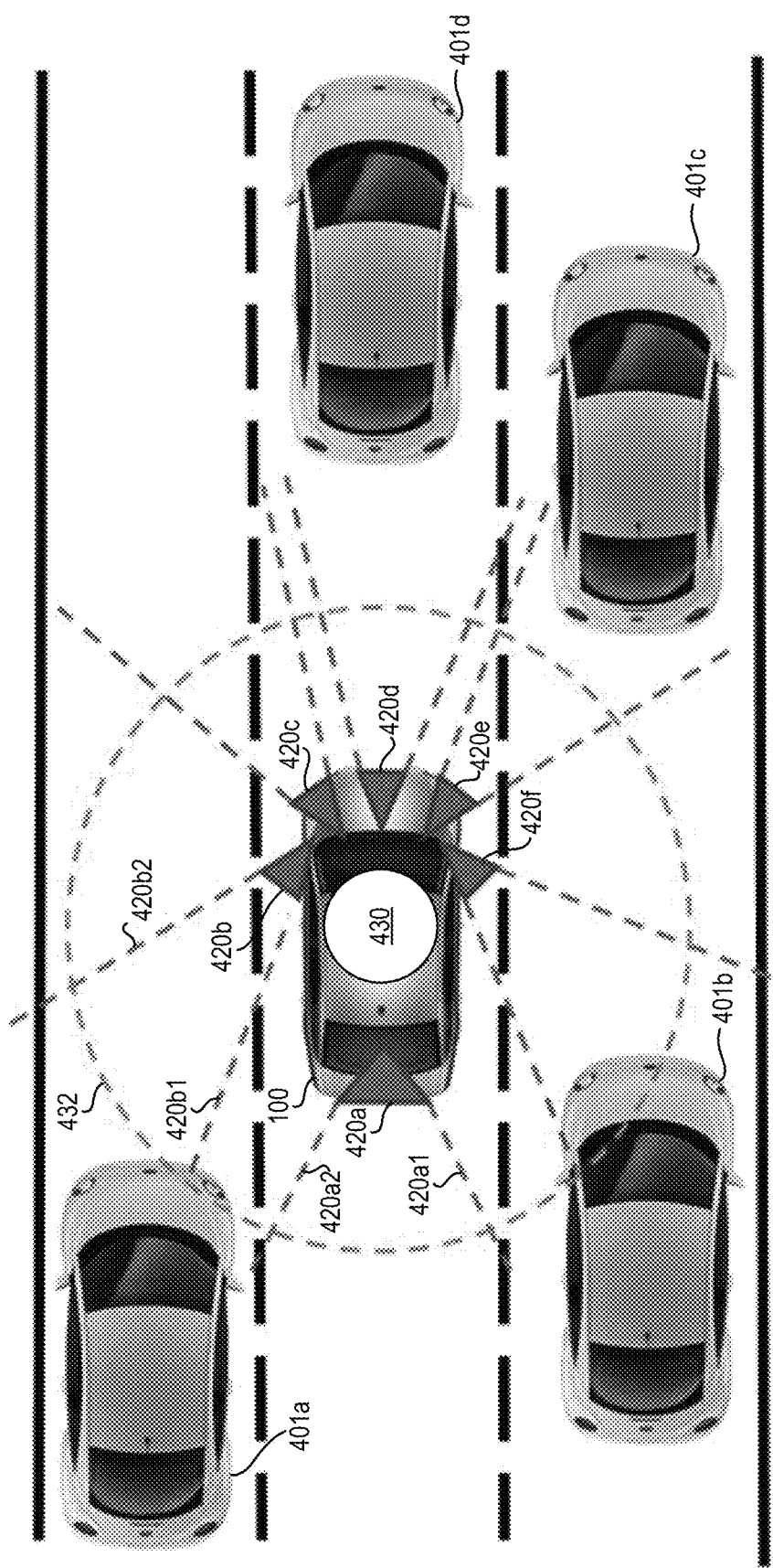
FIG. 4 depicts the vehicle of FIG. 1 having a virtual cylindrical omni-directional camera that generates a projection about the vehicle using data from sensors of the vehicle according to one or more embodiments described herein.

FIG. 4 depicts the vehicle 100 of FIG. 1 having a VCOC 430 that generates a projection 432 about the vehicle 100 using data from sensors of the vehicle according to one or more embodiments described herein. The sensors can include cameras, radar sensors, and/or LiDAR sensors.

In the example of FIG. 2, the sensors of the vehicle 100 include six cameras: 420a, 420b, 420c, 420d, 420e, 420f (collectively the "cameras 420"). Each of the cameras 420 includes a field-of-view (FOV). For example, the camera 420a includes a FOV defined by boundaries 420a1, 420a2; the camera 420b includes a FOV defined by boundaries 420b1, 420b2; and so on for the other cameras 420c-420f. The cameras 420 capture image data within their respective FOVs. The image data can be used for object detection and tracking. For example, the cameras 420 capture images of the objects 401a, 401b, 401c, 401d (collectively the "objects 401"). The objects 401 are depicted as vehicles but can be any suitable object.

In this example, VCOC 430 can simultaneously handle detection coming from multiple non-overlapping sensors (e.g., the cameras 420a-420f). This is more efficient than processing sensor inputs one-by-one and accordingly represents an improvement in the functioning of the processing system 110 because it can simultaneously handle detection from multiple non-overlapping sensors.

Figure 6:
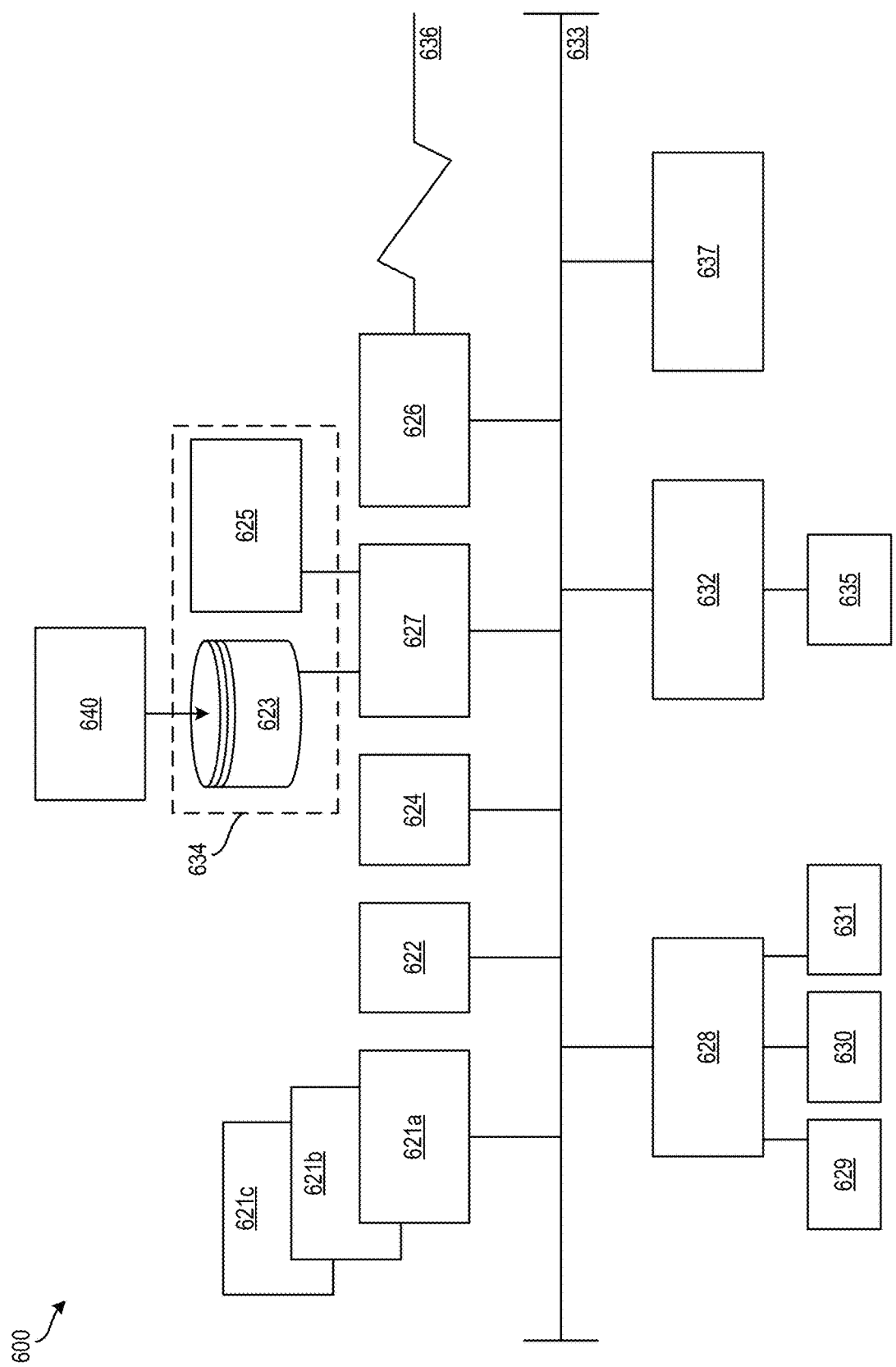
FIG. 6 depicts a block diagram of a processing system for implementing the techniques described herein according to an exemplary embodiment.

It is understood that the present disclosure is capable of being implemented in conjunction with any other type of computing environment now known or later developed. For example, FIG. 6 depicts a block diagram of a processing system 600 for implementing the techniques described herein. In examples, the processing system 600 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of the processing system 600.

Further depicted are an input/output (I/O) adapter 627 and a network adapter 626 coupled to the system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to the system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to the system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632.

An input device 629 (e.g., a keyboard, a microphone, a touchscreen, etc.), an input pointer 630 (e.g., a mouse, trackpad, touchscreen, etc.), and/or a speaker 631 may be interconnected to system bus 633 via user interface adapter 628, which may include, for example, a Super I/O chip integrating multiple device adapters into a single integrated circuit. One or more of the cameras 120-123, 130-133 are also connected to the system bus 633.

In some aspects of the present disclosure, the processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing and has a highly parallel structure that makes it more effective than general-purpose CPUs for algorithms where processing of large blocks of data is done in parallel.

Thus, as configured herein, the processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 to coordinate the functions of the various components shown in the processing system 600.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for multi-sensor multi-object tracking, the method comprising:
   projecting, by a processing device, tracked targets onto a virtual cylindrical omni-directional camera (VCOC);
   projecting, by the processing device, detected targets onto the VCOC;
   computing, by the processing device, a two-dimensional intersection-over-union (2D-IOU) between the tracked targets and the detected targets;
   performing, by the processing device, an association between the tracked targets and the detected targets based at least in part on the computed IOU; and
   controlling, by the processing device, a vehicle based at least in part on the association.

2. The computer-implemented method of claim 1, wherein computing the 2D-IOU between the tracked targets and the detected targets is performed simultaneously for a plurality of non-overlapping sensors.

3. The computer-implemented method of claim 1, wherein the tracked targets are three-dimensional.

4. The computer-implemented method of claim 1, wherein the tracked targets and the detected targets are projected as projected quadrilaterals.

5. The computer-implemented method of claim 4, wherein computing the 2D-IOU comprises computing an intersection between two projected quadrilaterals.

6. The computer-implemented method of claim 5, wherein the 2D-IOU between the two projected quadrilaterals is given by the following equation:

$$IOU(q_1, q_2) = \frac{\text{intersection}(q_1, q_2)}{\text{area}(q_1) + \text{area}(q_2) - \text{intersection}(q_1, q_2)}$$

where $\text{area}(q) = (h_2 - h_1) \cdot (\phi_2 - \phi_1) \cdot f_r$.

7. The computer-implemented method of claim 1, wherein the processing device is disposed in the vehicle.

8. A system comprising:
   a memory comprising computer readable instructions; and
   a processing device for executing the computer readable instructions for performing a method for multi-sensor multi-object tracking, the method comprising:
   projecting, by the processing device, tracked targets onto a virtual cylindrical omni-directional camera (VCOC);
   projecting, by the processing device, detected targets onto the VCOC;
   computing, by the processing device, a two-dimensional intersection-over-union (2D-IOU) between the tracked targets and the detected targets;
   performing, by the processing device, an association between the tracked targets and the detected targets based at least in part on the computed IOU; and
   controlling, by the processing device, a vehicle based at least in part on the association.

9. The system of claim 8, wherein computing the 2D-IOU between the tracked targets and the detected targets is performed simultaneously for a plurality of non-overlapping sensors.

10. The system of claim 8, wherein the tracked targets are three-dimensional.

11. The system of claim 8, wherein the tracked targets and the detected targets are projected as projected quadrilaterals.

12. The system of claim 11, wherein computing the 2D-IOU comprises computing an intersection between two projected quadrilaterals.

13. The system of claim 12, wherein the 2D-IOU between the two projected quadrilaterals is given by the following equation:

$$IOU(q_1, q_2) = \frac{\text{intersection}(q_1, q_2)}{\text{area}(q_1) + \text{area}(q_2) - \text{intersection}(q_1, q_2)}$$

where $\text{area}(q) = (h_2 - h_1)(\phi_2 - \phi_r) \cdot f_r$.

14. The system of claim 8, wherein the processing device is disposed in the vehicle.

15. A computer program product comprising:
   a non-transitory computer readable storage medium having program instructions embodied therewith, the program instructions executable by a processing device to cause the processing device to perform a method for multi-sensor multi-object tracking, the method comprising:

projecting, by the processing device, tracked targets onto a virtual cylindrical omni-directional camera (VCOC);

projecting, by the processing device, detected targets onto the VCOC;

computing, by the processing device, a two-dimensional intersection-over-union (2D-IOU) between the tracked targets and the detected targets;

performing, by the processing device, an association between the tracked targets and the detected targets based at least in part on the computed IOU; and controlling, by the processing device, a vehicle based at least in part on the association.

16. The computer program product of claim 15, wherein computing the 2D-IOU between the tracked targets and the detected targets is performed simultaneously for a plurality of non-overlapping sensors.

17. The computer program product of claim 15, wherein the tracked targets are three-dimensional.

18. The computer program product of claim 15, wherein the tracked targets and the detected targets are projected as projected quadrilaterals.

19. The computer program product of claim 18, wherein computing the 2D-IOU comprises computing an intersection between two projected quadrilaterals.

20. The computer program product of claim 19, wherein the 2D-IOU between the two projected quadrilaterals is given by the following equation:

$$IOU(q_1, q_2) = \frac{\text{intersection}(q_1, q_2)}{\text{area}(q_1) + \text{area}(q_2) - \text{intersection}(q_1, q_2)}$$

where $\text{area}(q) = (h_2 - h_1) \cdot (\phi_2 - \phi_1) \cdot f_r$.

* * * * *